Patented Nov. 4, 1947

2,430,269

UNITED STATES PATENT OFFICE 2,430,269

MERCAPTAN EXTRACTION

Richmond T. Bell, Highland Park, Ill., assignor to The Pure Oil Company, Chicago, Ill., a corporation of Ohio No Drawing. Application March 24, 1945, Serial No. 584,743

4 Claims. (Cl. 260—609)

This invention relates to separation of mercaptans from admixtures of mercaptans and hydrocarbons.

In the preparation of mercaptans by reaction of olefinic hydrocarbons with hydrogen sulfide in the presence of a catalyst, particularly a Friedel-Crafts catalyst such as anhydrous aluminum chloride, fluoboric acid, and mixtures of hydrogen fluoride and boron trifluoride, there is formed a reaction product composed of mercaptans and unreacted olefins and other hydrocarbons which may have been present in the charging stock. The mixture may contain from 10 to 75 per cent or more of mercaptans, depending on the olefin charging stock and the conditions under which the reaction is carried out.

Where mercaptans are synthesized from an olefinic stock of wide boiling range, such as copolymer formed by solid phosphoric acid catalyzation of mixed butenes, separation of the resulting mercaptans from the hydrocarbons by fractional distillation is difficult because of the overlapping boiling points of the hydrocarbons and the mercaptans present in the mixture. Also, separation of mercaptans from hydrocarbons by fractional distillation may be impractical where the mercaptan content of the mixture is low.

This invention is directed to a process of separating mercaptans from admixtures with hydrocarbons by means of extraction. I have found that if admixtures of mercaptans and hydrocarbons are extracted with caustic alkali-methanol solution containing approximately 5 to 30 per cent, and preferably 10 to 30 per cent by weight of water, mercaptans substantially free of hydrocarbons can be separated from the mixture. In the absence of water, hydrocarbons dissolve in the extract phase to a large extent, greatly decreasing the degree of separation of mercaptans from the hydrocarbons. Although pure hydrocarbons are only slightly soluble in caustic alkali-methanol solution, in the presence of large amounts of mercaptans a substantial proportion of the hydrocarbons is dissolved in the extract phase. The difficulty in separating mercaptans from olefins is even greater than that in separating paraffins from mercaptans since the olefins in the presence of mercaptans are more soluble in caustic alkali-methanol solution than are paraffins. However, by adding water to the caustic alkali-methanol solution the solubility of the hydrocarbons in the solution is decreased to a much greater extent than is the solubility of mercaptans with the result that mercaptans can be more efficiently separated from the hydrocarbons.

In order to demonstrate the invention a number of extractions were made using caustic alkali-methanol solutions containing different amounts of water. The results of the extractions are set forth in the following table:

Table

| Ref. No. | Charging Stock | | Caustic Methanol Solution | | | | Extract | | | Raffinate | | | | Per cent by Wt. of Hydrocarbons, based on charging stock, in— | |
|---|---|---|---|---|---|---|---|---|---|---|---|---|---|---|---|
| | Gm. Treated | Per cent RSH-S | Quantity Used | Per cent H₂O | Per cent CH₃OH | Per cent KOH | Gm. | Per cent RSH-S | Per cent of Charge | Gm. | Per cent RSH-S | Per cent of Charge | Per cent Recovery | Extract | Raffinate |
| 1 | 1,154.0 | 10.33 | 1,264 | 0.8 | 74.6 | 24.6 | 934.0 | 11.91 | 80.9 | 171.7 | 0.26 | 14.9 | 95.8 | | |
| 2 | 100.0 | 11.91 | 100 | 4.7 | 70.3 | 25.0 | 81.1 | 13.17 | 81.1 | 16.7 | 6.24 | 16.7 | 97.8 | | |
| 3 | 100.0 | 11.91 | 100 | 15.6 | 59.4 | 25.0 | 63.0 | 14.49 | 63.0 | 34.4 | 7.21 | 34.4 | 97.4 | | |
| 4 | 100.0 | 11.91 | 100 | 29.5 | 45.5 | 25.0 | 45.4 | 15.73 | 45.4 | 52.5 | 8.56 | 52.5 | 97.9 | | |
| 5 | 400.0 | 1.86 | 93 | 6.4 | 58.6 | 35.0 | 48.5 | 12.05 | 12.1 | 326.5 | 0.25 | 81.6 | 93.7 | | |
| 6 | 400.0 | 1.86 | 93 | 12.8 | 52.2 | 35.0 | 40.6 | 13.38 | 10.2 | 339.7 | 0.46 | 84.9 | 95.1 | | |
| 7 | 400.0 | 1.86 | 93 | 19.2 | 45.8 | 35.0 | 33.0 | 14.40 | 8.3 | 347.7 | 0.43 | 86.9 | 95.2 | | |
| 8 | 100.0 | 10.18 | 107 | 2.5 | 77.5 | 20.0 | 50.6 | 15.90 | 50.6 | 41.5 | 2.35 | 41.5 | 92.1 | | |
| 9 | 100.0 | 10.18 | 107 | 5.0 | 75.0 | 20.0 | 47.3 | 16.53 | 47.3 | 44.7 | 2.64 | 44.7 | 92.0 | | |
| 10 | 100.0 | 10.18 | 107 | 10.0 | 70.0 | 20.0 | 39.2 | 17.34 | 39.2 | 51.8 | 3.07 | 51.8 | 91.0 | | |
| 11 | 100.0 | 7.78 | 167 | 0.0 | 90.0 | 10.0 | 79.9 | 8.63 | 79.9 | 14.8 | 1.21 | 14.8 | 94.7 | 38.5 | 14.4 |
| 12 | 100.0 | 7.78 | 167 | 2.0 | 88.0 | 10.0 | 76.8 | 8.72 | 76.8 | 18.8 | 1.10 | 18.8 | 95.6 | 36.1 | 18.3 |
| 13 | 100.0 | 7.69 | 167 | 5.0 | 85.0 | 10.0 | 68.7 | 9.69 | 68.7 | 27.3 | 1.27 | 27.3 | 96.0 | 27.8 | 26.1 |
| 14 | 100.0 | 7.65 | 167 | 10.0 | 80.0 | 10.0 | 62.5 | 10.39 | 62.5 | 32.9 | 1.07 | 32.9 | 95.4 | 22.5 | 32.1 |
| 15 | 100.0 | 7.21 | 167 | 20.0 | 70.0 | 10.0 | 50.1 | 11.64 | 50.1 | 45.4 | 1.58 | 45.4 | 95.5 | 13.9 | 42.8 |
| 16 | 300.0 | 0.0 | 300 | 0.0 | 90.0 | 10.0 | 12.3 | 0.0 | 4.1 | 279.8 | 0.0 | 93.3 | 97.4 | | |
| 17 | 300.0 | 0.0 | 300 | 2.0 | 88.0 | 10.0 | 5.7 | 0.0 | 1.9 | 288.5 | 0.0 | 96.2 | 98.1 | | |
| 18 | 300.0 | 0.0 | 300 | 5.0 | 85.0 | 10.0 | 4.3 | 0.0 | 1.4 | 288.5 | 0.0 | 96.2 | 97.6 | | |
| 19 | 300.0 | 0.0 | 300 | 10.0 | 80.0 | 10.0 | 2.1 | 0.0 | 0.7 | 293.0 | 0.0 | 97.7 | 98.4 | | |

In the table the charging stock for run 1 was the reaction product prepared by reaction of copolymer produced by polymerization of C₄ gases from an oil cracking operation in the presence of solid phosphoric acid catalyst at approximately 600–800 pounds per square inch and at temperatures of about 150–200° C., and hydrogen sulfide at 25° C. and atmospheric pressure in the presence of anhydrous aluminum chloride.

Runs 2, 3 and 4 were made on the extract produced in Run 1.

Runs 5, 6 and 7 were made on the reaction product prepared by reacting copolymers and hydrogen sulfide at 50° C. and atmospheric pressure in the presence of anhydrous aluminum chloride in mole ratio to unit charge of 1.0 to 7.76.

Runs 8, 9 and 10 were made on the reaction product prepared by reacting triisobutylene and hydrogen sulfide at 24.8° C. and atmospheric pressure in the presence of anhydrous aluminum chloride.

Runs 11 to 15 were made on a blend of triisobutylene and 1-dodecanethiol. The blend contained approximately 50% of each.

Runs 16 to 19 were made on triisobutylene used in producing the extraction charging stock for runs 8 to 10 and in the blends for runs 11 to 15.

By fractionation under vacuum it was determined that the mercaptans in the extraction charging stock for run 1 were principally dodecyl mercaptans with a lesser amount of octyl mercaptans. From a comparison of the sulfur contents of pure dodecyl mercaptans and pure octyl mercaptans, 15.84 and 21.96 per cent respectively, with the mercaptan-sulfur content of the charging stock for run 1, it is apparent that the charging stock contained a large proportion of unreacted hydrocarbons. Using a potassium hydroxide-methanol solution containing only 0.8 per cent by weight of water, 81 per cent by weight of the charge was dissolved in and subsequently recovered from the caustic alkali-methanol solution, whereas only 14.9 per cent remained undissolved. The balance of 4.2 per cent represents the loss incurred in the laboratory batch extraction procedure. The mercaptan-sulfur in the extract increased about 1.6 per cent over that in the charging stock.

Run 2 also demonstrates that a large portion of the hydrocarbons dissolved in the caustic alkali-methanol extract phase.

Run 3 made with a caustic potash-methanol solution containing 15.6 per cent by weight of water resulted in a much better separation between hydrocarbons and mercaptans, as shown by the mercaptan sulfur content of the extract.

The separation between mercaptans and hydrocarbons was even more effective in run 4, in which an extract containing 15.73 per cent of mercaptan sulfur was obtained using an extracting solution containing 29.5 per cent by weight of water. The mercaptan-sulfur content of this extract closely approached the theoretical value for dodecyl mercaptans.

Runs 5, 6 and 7 were made on a charging stock containing a relatively low mercaptan content. As a result separation between hydrocarbons and mercaptans was good with a caustic methanol solution containing as low as 6.4 per cent by weight of water. However, even in case of low mercaptan concentrations the separation improved by increasing the dilution with water as shown by comparison of runs 5, 6 and 7.

Runs 8, 9 and 10 show comparable results in extracting a mixture rich in mercaptans with a potassium hydroxide-methanol solution containing a fixed amount of potassium hydroxide and varying amounts of water. Here again a steady increase in mercaptan sulfur content of the extract appears with increase in the water content of the solvent.

Runs 11 to 15 are designed to show accurately the per cent of mercaptans actually extracted with different solutions, keeping in mind that 1-dodecanethiol contains 15.8 per cent of sulfur. By comparing the mercaptan-sulfur in the various materials with the theoretical amount present in pure 1-dodecanethiol, the percentage of mercaptan in the particular product can be easily determined. In run 11 the extract contained about 46 per cent of hydrocarbons, whereas in run 15 the extract contained about 27 per cent of hydrocarbons.

Runs 16 to 19 are included to demonstrate the fact that in the absence of mercaptans, triisobutylene is only slightly soluble in caustic methanol solution regardless of the water content, although the same trend of decreasing solubility with increasing water content is apparent. In run 16 in which the caustic potash-methanol contained no water, triisobutylene was only soluble to the extent of 4.1 per cent, whereas in run 19 in which the caustic methanol contained 10 per cent of water, triisobutylene was soluble to the extent of 0.7 per cent. Compare run 19 with run 14 in which 34.4 per cent of the extract was hydrocarbons although the extracting solvent contained 10 per cent of water.

Thus in order to obtain a mercaptan product containing a low hydrocarbon content it is necessary to use a caustic alkali-methanol solution containing in excess of 5 per cent and preferably in excess of 10 per cent by weight of water, and not more than 30 per cent by weight of water. Water contents in excess of 30 per cent have very little more effect than solutions containing less than 30 per cent of water in concentrating the mercaptans in the extract, and give low yields because as the water content of the caustic alkali-methanol solution increases above this amount the ability to dissolve mercaptans is greatly decreased.

Caustic alkali-methanol solutions which are satisfactory for the purpose of extracting mercaptans from admixtures with hydrocarbons are those containing approximately from 10 to 30 per cent by weight of caustic alkali. Solutions containing in excess of 30 per cent of caustic alkali are apt to cause emulsion difficulties, and solutions containing less than 10 per cent of caustic alkali are not particularly effective in extracting mercaptans. Although either sodium or potassium hydroxide-methanol solution may be used, I prefer to use potassium hydroxide solution since the efficiency of the potassium hydroxide solution is greater than that of the caustic soda solution.

By subjecting a mixed hydrocarbon-mercaptan product to a series of extraction steps with a series of caustic alkali-methanol solutions containing approximately 5 to 30 per cent of water with decreasing water content and increasing alkali content of the solutions as the mercaptan content in the raffinate becomes lower, substantially the entire mercaptan content can be separated from the hydrocarbon content of the product with very little contamination by hydrocarbons.

In carrying out the process I prefer to carry out the extraction countercurrently in a suitable contact tower with a volume ratio of solvent to product to be extracted such that the amount of caustic alkali present in the caustic-methanol solution charged is at least 10 per cent more than that equivalent to the mercaptan content of the product as charged. Where mercaptans are recovered from the spent caustic alkali-methanol solution by hydrolysis and distillation the quantity of excess alkali is of less importance than where mercaptans are recovered by neutralization of the spent caustic-methanol because the excess alkali is recovered unchanged in the former case whereas in the latter it is converted to a salt. The excess should preferably not exceed 100 per cent and generally need not be substantially more than about 10 per cent of the stoichiometric amount theoretically required for complete reaction with the entire mercaptan content of the product to be extracted. When neutralization is used to separate extract from solvent I prefer to use an acid, such as acetic or formic acid, as a neutralizing agent since less heat is evolved during neutralization and the alkali-metal salts are much more soluble in the resulting aqueous methanol phase than with a common mineral acid such as sulfuric acid.

The extracting process in accordance with my invention is generally carried out at normal room temperature, namely approximately 20° C., but as low temperatures as are consistent with satisfactory operation are preferred, depending principally upon the viscosities of fresh and spent solvent, and emulsion and separation difficulties. Higher temperatures such as 30° or 40° C., may be used, but extraction efficiencies generally are lower, other factors being equal, and losses may be higher.

My process is particularly useful in conjunction with vacuum fractionation in treating stocks in which the hydrocarbons present boil at temperatures close to the boiling point of the mercaptans present in the mixture, and in connection with separation of mercaptans from admixtures in which the mercaptans are present in low concentrations. In the latter case, an extract can be prepared having a high concentration of mercaptans, and this extract can be further concentrated by vacuum fractionation to obtain a mercaptan product meeting commercial requirements. By fractionating hydrocarbon-mercaptan mixtures under reduced pressure, mercaptans and hydrocarbons can be separated without decomposition of the mercaptans provided the mercaptans are not subjected to temperatures substantially greater than approximately 180° C.

Although my process is particularly useful in the separation of mercaptans of high molecular weight such as dodecyl and octyl mercaptans from hydrocarbons, it can be used for the separation of mercaptans of lower molecular weight such as butyl mercaptans, and admixtures of mercaptans, from hydrocarbons, both paraffinic and olefinic.

It is claimed:

1. In a method of separating liquid mercaptans from mixtures with liquid hydrocarbons consisting chiefly of olefins containing twelve carbon atoms in the molecule in which mixture mercaptans are present in an amount of at least 25 per cent by weight, the step comprising contacting said mixture with a solution consisting of potassium hydroxide, methanol and water which solution contains approximately 10 to 30 per cent by weight of water and sufficient potassium hydroxide to react with all the mercaptans present but less than twice the stoichiometric equivalent of the mercaptans present in said mixture.

2. Method in accordance with claim 1 in which the mixture is extracted in a plurality of steps and the water content of the potassium hydroxide-methanol solution decreases in each successive step.

3. The method of preparing commercial grade mercaptans from a mixture composed chiefly of normally liquid olefins and mercaptans in which the latter are present in an amount of at least 25% by weight comprising extracting said mixture with a solution consisting of water, methyl alcohol and alkali metal hydroxide containing approximately 10 to 30 percent by weight of water and 10 to 30 percent by weight of alkali metal hydroxide, the quantity of solution being such that the amount of alkali metal hydroxide contained therein is up to 100 per cent in excess of stoichiometric equivalent of the mercaptans in said mixture.

4. Method in accordance with claim 3 in which the mixture is extracted with successive batches of solution of decreasing water content.

RICHMOND T. BELL.

REFERENCES CITED

The following references are of record in the file of this patent:

UNITED STATES PATENTS

| Number | Name | Date |
| --- | --- | --- |
| 1,968,842 | Malisoff | Aug. 7, 1934 |
| 2,152,721 | Yabroff | Apr. 4, 1939 |